(12) United States Patent
Kennedy et al.

(10) Patent No.: US 9,830,116 B2
(45) Date of Patent: Nov. 28, 2017

(54) PRINTING DEVICE DISCOVERY

(71) Applicant: Hewlett-Packard Development Company, L. P., Houston, TX (US)

(72) Inventors: Smith Kennedy, Boise, ID (US); Alan C Berkema, Granite Bay, CA (US); David O Hamilton, Ramona, CA (US); Kenneth K Smith, Boise, ID (US); David W Kinkley, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/519,633

(22) PCT Filed: Oct. 23, 2014

(86) PCT No.: PCT/US2014/062052
§ 371 (c)(1),
(2) Date: Apr. 17, 2017

(87) PCT Pub. No.: WO2016/064408
PCT Pub. Date: Apr. 28, 2016

(65) Prior Publication Data
US 2017/0315763 A1 Nov. 2, 2017

(51) Int. Cl.
*H04B 1/38* (2015.01)
*G06F 3/12* (2006.01)
*H04W 52/02* (2009.01)

(52) U.S. Cl.
CPC .......... *G06F 3/1226* (2013.01); *G06F 3/1292* (2013.01); *H04W 52/0229* (2013.01); *H04W 52/0251* (2013.01)

(58) Field of Classification Search
USPC ....... 455/3.06, 550.1, 556.1, 500, 41.1–41.3, 455/574
See application file for complete search history.

(56) References Cited

U.S. PATENT DOCUMENTS

| 8,045,961 | B2 | 10/2011 | Ayed et al. |
| 8,248,637 | B2 | 8/2012 | Dolan et al. |
| 2005/0146744 | A1 | 7/2005 | McAllister et al. |
| 2007/0207765 | A1 | 9/2007 | Nakahara et al. |

(Continued)

FOREIGN PATENT DOCUMENTS

CN 203543376 U 4/2014

OTHER PUBLICATIONS

Lera Blog, "Connecting Your Smartphone to Printer," (Web Page), 5 pages—http://lerablog.org/technology/.

*Primary Examiner* — Fayyaz Alam
(74) *Attorney, Agent, or Firm* — Fabian VanCott

(57) ABSTRACT

A method of printing device discovery includes, with a low energy wireless (LEW) device within the printing device, sending a number of announcement messages. The printing device is in a sleep mode. The method further includes waking up the printing device upon receiving a response to the announcement messages from a mobile computing device. An LEW connection is established with the mobile computing device. The method further includes creating a second non-LEW wireless connection between the printing device and the mobile computing device.

15 Claims, 8 Drawing Sheets

(56) References Cited

U.S. PATENT DOCUMENTS

| | | | |
|---|---|---|---|
| 2008/0313481 A1* | 12/2008 | Paljug | G06F 1/3209 |
| | | | 713/323 |
| 2011/0063663 A1 | 3/2011 | Kim et al. | |
| 2011/0212746 A1* | 9/2011 | Sarkar | H04W 52/0274 |
| | | | 455/552.1 |
| 2012/0195387 A1* | 8/2012 | Masuda | H04M 1/7253 |
| | | | 375/259 |
| 2012/0315853 A1 | 12/2012 | Lambert | |
| 2013/0182798 A1 | 7/2013 | Lozano | |
| 2014/0114782 A1 | 4/2014 | Cloin et al. | |
| 2014/0301228 A1* | 10/2014 | Kwak | H04W 8/005 |
| | | | 370/252 |
| 2015/0245298 A1* | 8/2015 | Takahashi | H04W 52/0254 |
| | | | 455/574 |
| 2016/0231741 A1* | 8/2016 | Felteau | G05D 1/0022 |
| 2016/0242065 A1* | 8/2016 | Fukuta | H04W 72/04 |

\* cited by examiner

PRINTING DEVICE DISCOVERY

BACKGROUND

Printing devices are devices capable of rendering hard copy graphics or text on a print medium, such as paper, as well as performing additional functions such as faxing documents, creating and transmitting emails, photocopying documents, and scanning documents. A user may wish to use the printing device to print documents located on a number of computing devices including a mobile smart phone or tablet. In some situations, the printing device may not be communicatively coupled to the computing device, and communication, between the computing device and the printing device may be difficult due to a general lack of compatible settings and protocols.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
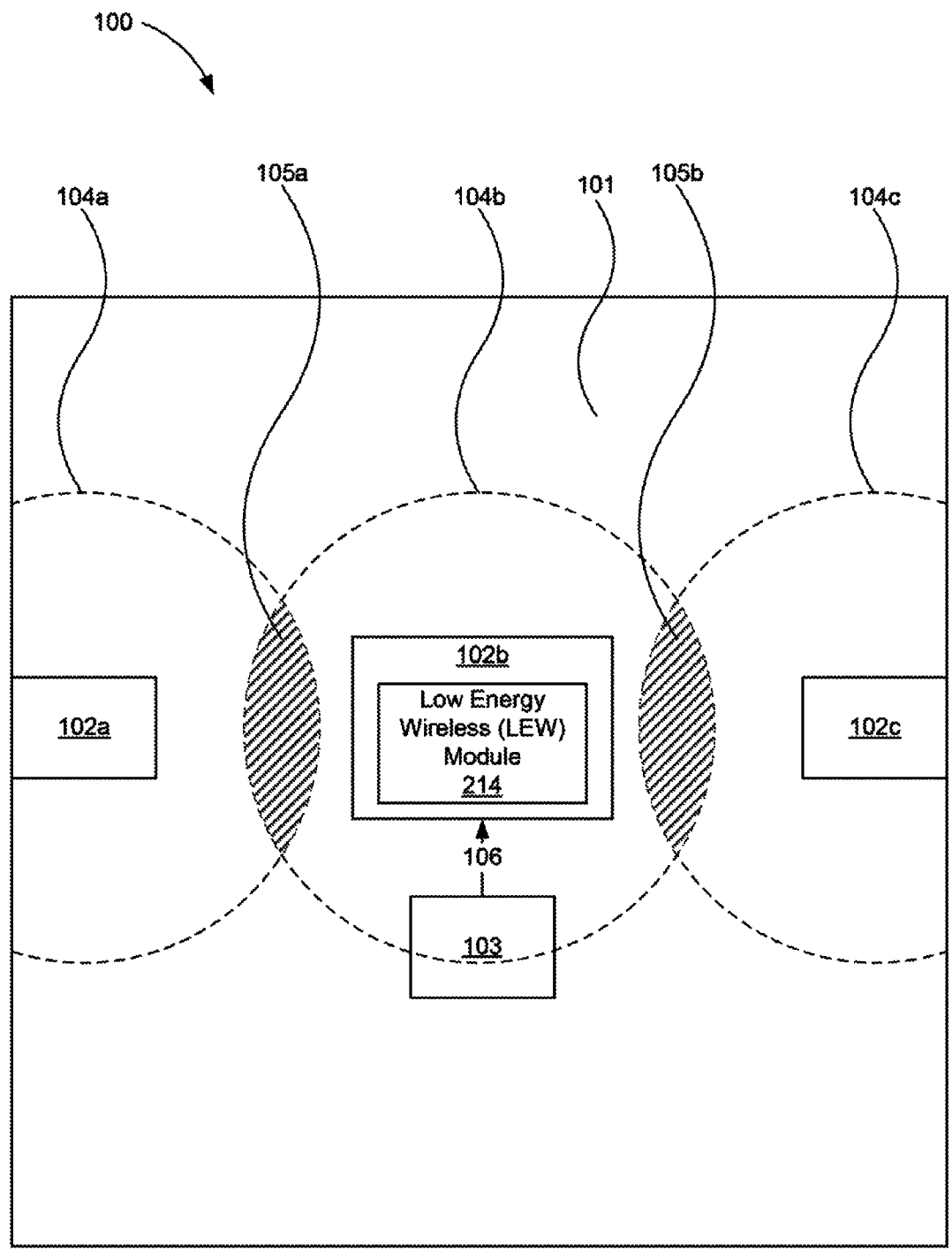
FIG. 1 is a diagram of a system for printing device discovery, according to one example of the principles described herein.

In situations where a printing device and a computing device are compatible, a user may have to perform a number of complicated steps to create a connection between the computing device and the printer. Further, some forms of communication between the printing device and the computing device may be extremely slow, may be subject to a higher security threat, and may require that the printing device be powered on or in an awake (non-sleep) mode consuming electrical power continually.

Examples described herein provide systems and methods for performing a handover process from a low energy wireless (LEW) connection to a non-LEW connection in a manner that requires little or no user interaction. The LEW connection allows for the printing device to be selected by a mobile computing device. Further, the printing device may remain in a sleep mode where a number of components of the printing device may be maintained in a low power sleep mode, with the printing device's LEW device sending the announcements and/or listening in receive mode. The printing device may be sent instructions to wake up via the transmission of announcements from a printing device via a Low Energy Wireless (LEW) communication protocol, and the receipt of responses to the announcements from a mobile computing device. When a user of a mobile computing device invokes a print function in the mobile computing device, the mobile computing device sends the response to the printing device's announcement message, and the LEW device of the printing device wakes up the other components of the printing device. In one example, all components of the printing device are initially in a sleep mode except for the LEW device.

The present application further provides for a handover process to be performed where connectivity is handed over from an LEW connection to a non-LEW connection such as a wireless local area network (WLAN) connection. This allows for relatively larger amounts of data to be transferred via a non-LEW connection after initially creating an LEW connection while still providing for the energy savings that the operation of only the LEW device while the printing device is in sleep mode provides.

As used in the present specification and in the appended claims, the terms "low energy wireless" or "LEW" means any wireless communication technology that draws significantly less energy in order to transfer signals than other, non-low energy wireless communications technology. For example, LEW communication may include a low energy wireless communication technology as defined by the BLUETOOTH® SIG. Such BLUETOOTH® SIG technologies may include BLUETOOTH® SMART and BLUETOOTH® SMART READY communication technologies as developed by the BLUETOOTH® SIG. A device utilizing an LEW communication type as defined herein is capable of utilizing at least LEW communication types. In another example, a device utilizing an LEW communication type as defined herein is capable of utilizing LEW communication types along with other types of wireless communication such as, for example, non-low energy communications technologies as defined by the BLUETOOTH® SIG, communication technologies as defined under the IEEE 802.11 standard, and near-field communication (NFC) technologies, among other communication technologies, or combinations thereof.

Non-LEW communication may include a non-low energy wireless communication technology as defined by the BLUETOOTH® SIG. Such BLUETOOTH® SIG technologies may include BLUETOOTH communication technologies as developed by the BLUETOOTH® SIG. Another example of a non-LEW communication type may include any wireless local area network (WLAN) communication technology as defined under the Institute of Electrical and Electronics Engineers (IEEE) 802.11 standard such as the WI-FI® local area wireless communication type as defined by the Wi-Fi Alliance.

Even still further, as used in the present specification and in the appended claims, the term "a number of" or similar language is meant to be understood broadly as any positive number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of a system (100) for printing device discovery, according to one example of the principles described herein. The system (100) may include a number of printing devices (102a, 102b, 102c) located in a common area (101). In one example, the printing devices (102a, 102b, 102c) may be co-located in the common area (101) such as the same floor of an office building or set up as a bank of printing devices in a hotel lobby. The common area (101) may be any area in which a number of printing devices (102a, 102b, 102c) are co-located such that computing devices may be able to choose from the printing devices (102a, 102b, 102c) in order to print documents to one or more of the printing devices (102a, 102b, 102c).

Each printing device (102a, 102b, 102c) within the common area (101) may have any number of document processing capabilities such as printing, scanning, photocopying, faxing, and emailing, among other functionalities, or combinations thereof. The printing devices (102a, 102b, 102c) may be liquid inkjet printers, toner-based printers, laser printers, virtual printers, and three-dimensional printers, among other types of printers, or combinations thereof. Further, each printing device (102a, 102b, 102c) may be different from another printing device (102a, 102b, 102c) based on these or other features.

As depicted in FIG. 1, each printing device (102a, 102b, 102c) may transmit data wirelessly to any number of computing devices at a radial communication range (104a, 104b, 104c) from the printing device (102a, 102b, 102c). In one example, the wireless communication type used by the printing devices (102a, 102b, 102c) to communicate and transmit data to and from a computing device may include a low energy wireless (LEW) communication type. As described above, LEW communication may include any communication technology that draws less energy in order to transfer signals than a non-low energy communications technology.

In one example, an LEW capable device or a printing device (102a, 102b, 102c) that utilizes LEW communications may run on a single cell battery such as a button cell to provide communication capabilities between the LEW capable device or printing device (102a, 102b, 102c) and a computing device to which the LEW capable device or printing device (102a, 102b, 102c) seeks to communicate. In the example of FIG. 1, printing device (102b) includes an LEW module (214). The LEW module (214) sends a number of announcement messages with a low energy wireless (LEW) device (FIG. 2, 210) within the printing device (102). The proximity of a mobile computing device (103) to the printing device (102b) is determined by the LEW module (214). Other printing devices (102a, 102c) may also include the LEW module (214) and associated devices.

Figure 2:
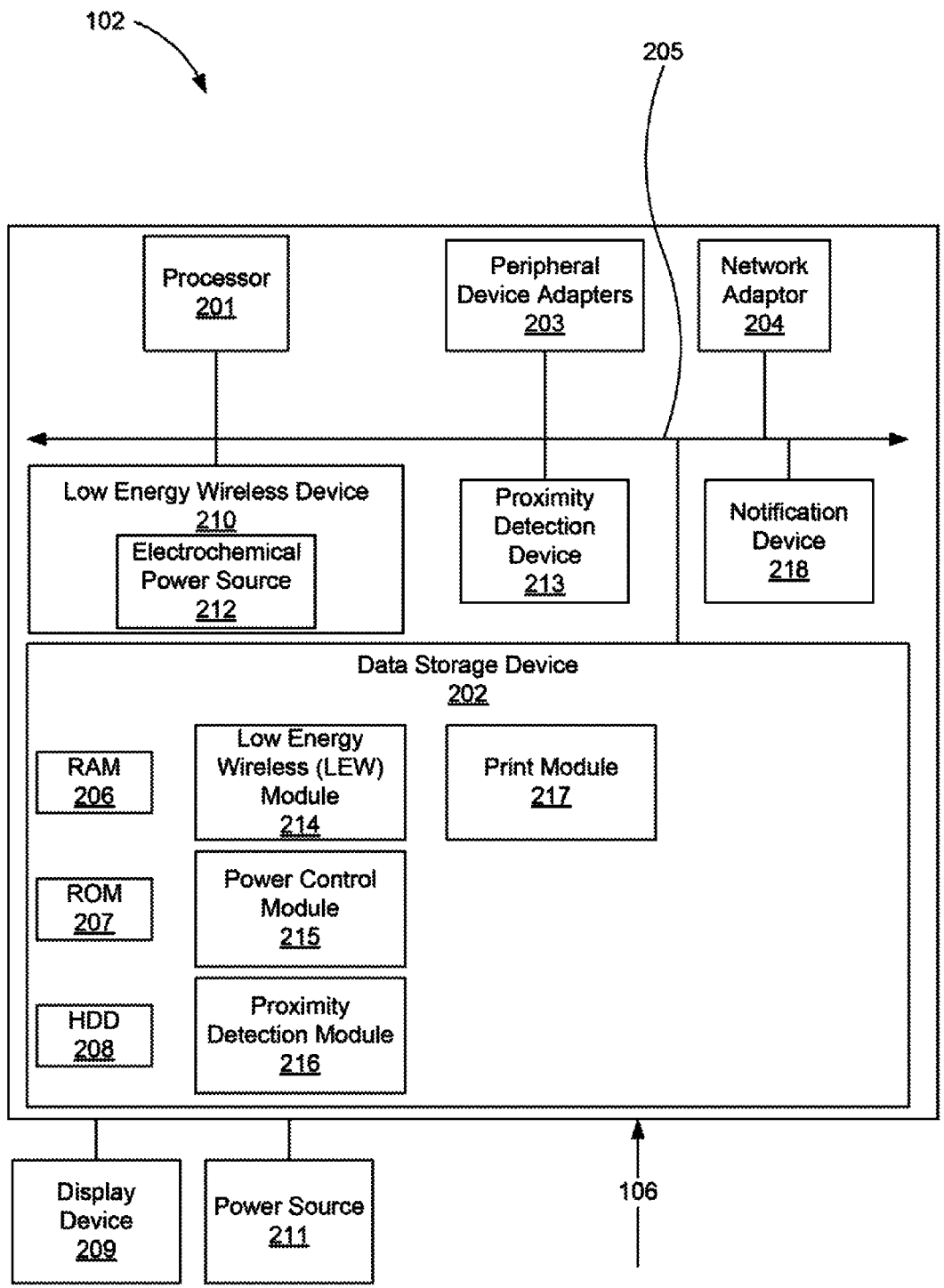
FIG. 2 is a diagram of a printing device within the system of FIG. 1, according to one example of the principles described herein.

In one example, the LEW module (214) send instruction to the printing device (102b) to wake upon receiving a response to the announcement messages (106) from a mobile computing device (103). An LEW connection is created by the LEW module (214) with the mobile computing device, and a handover process is performed where a second connection between the printing device (102b) and the mobile computing device (103) is created. The second connection includes a relatively higher data transfer speed than the LEW connection. The LEW module also assists other devices and modules in charging a battery cell of the LEW device (FIG. 2, 210).

By comparison to non-LEW communication types, LEW communication types consume power on the order of milliwatts in order to establish and maintain communication with a computing device. In contrast, other forms of on-LEW wired and wireless communication consume hundreds or thousands of milliwatts. Thus, LEW communication consumes much less energy than other types of wireless communication.

In one example, the LEW communication type is any LEW communication types as defined by the BLUETOOTH® Special Interest Group (SIG) such as BLUETOOTH® SMART and BLUETOOTH® SMART READY communication technologies developed by the BLUETOOTH® SIG. BLUETOOTH® SMART refers to a single mode low energy device that is capable of communicating with either a BLUETOOTH® SMART READY device or another BLUETOOTH® SMART device. BLUETOOTH® SMART READY refers to a dual-mode device that is capable of communicating with both BLUETOOTH® capable devices as well as a BLUETOOTH® SMART device or another BLUETOOTH® SMART READY device. LEW communication types have several advantages including: lower power requirements where an LEW device may operate for months or years on a button cell; relatively smaller footprint compared to other types of wireless capable hardware devices; relatively lower cost of manufacture and operation compared to other types of wireless capable hardware devices; and compatibility with a large base of computing devices such as mobile phones, tablet computing devices, laptop computing devices, among other types of computing devices.

Turning again to the figures, FIG. 1 depicts a mobile computing device (103) that may connect to one or more of the printing devices (102a, 102b, 102c) as described above and in more detail below. In one example, the mobile computing device (103) is a mobile, wireless computing device such as a mobile phone, a smart phone, a tablet computing device, a portable computing device, a laptop computing device, personal digital assistant (PDA), or a wearable computing device, among other types of mobile computing devices. The mobile computing device (103) may be brought into the proximity of one or more of the printing device (102a, 102b, 102c) within the radial communication range (104a, 104b, 104c) from the printing devices (102a, 102b, 102c) such that communication may be established between one or more of the printing devices (102a, 102b, 102c) and the mobile computing device (103).

The radial communication range (104a, 104b, 104c) at which the printing devices (102a, 102b, 102c) may establish communication with the mobile computing device (103) may be defined by a received signal strength indicator (RSSI) value, device transmit power level, a received channel power indicator (RCPI) value, other communication metric, or combinations thereof. The RCPI indicator value may include the management procedures defined by the IEEE 802.11K part of the IEEE 802.11-2012 found at sections 10.23.4 and 10.23.5 entitled, "Location Track Procedures" and "Timing Measurement Procedure," respectively.

These metrics are used by the printing devices (102a, 102b, 102c) and mobile computing device (103) to determine if the mobile computing device (103) is in a communication range (104a, 104b, 104c) of one or more of the printing devices (102a, 102b, 102c). The radial communication range (104a, 104b, 104c) may be determined by a proximity detection device (FIG. 2, 213) as will be described in more detail below.

The printing devices (102a, 102b, 102c), mobile computing device (103), or both may include hardware and software to enable the printing devices (102a, 102b, 102c), mobile computing device (103), or both to determine or receive one or more of these communication metrics in order to determine whether the mobile computing device (103) may connect to one or more of the printing devices (102a, 102b, 102c) or a network on which the printing devices (102a, 102b, 102c) operate. In one example, these communication metrics may be sent between the mobile computing device (103), the printing devices (102a, 102b, 102c), and among the individual printing devices (102a, 102b, 102c) to determine whether the mobile computing device (103) may connect to one or more of the printing devices (102a, 102b, 102c) or a network on which the printing devices (102a, 102b, 102c) operate. In this manner, a user of the mobile computing device (103) may connect to one or more of the printing devices (102a, 102b, 102c) based on proximity to a printing device (102a, 102b, 102c), proximity to a printing device (102a, 102b, 102c) to which the user wishes to connect, proximity to a printing device (102a, 102b, 102c) that includes functionality that meets the user's needs. More details regarding the establishment of communications between the printing devices (102a, 102b, 102c) and mobile computing device (103) will be described in more detail below.

Figure 3:
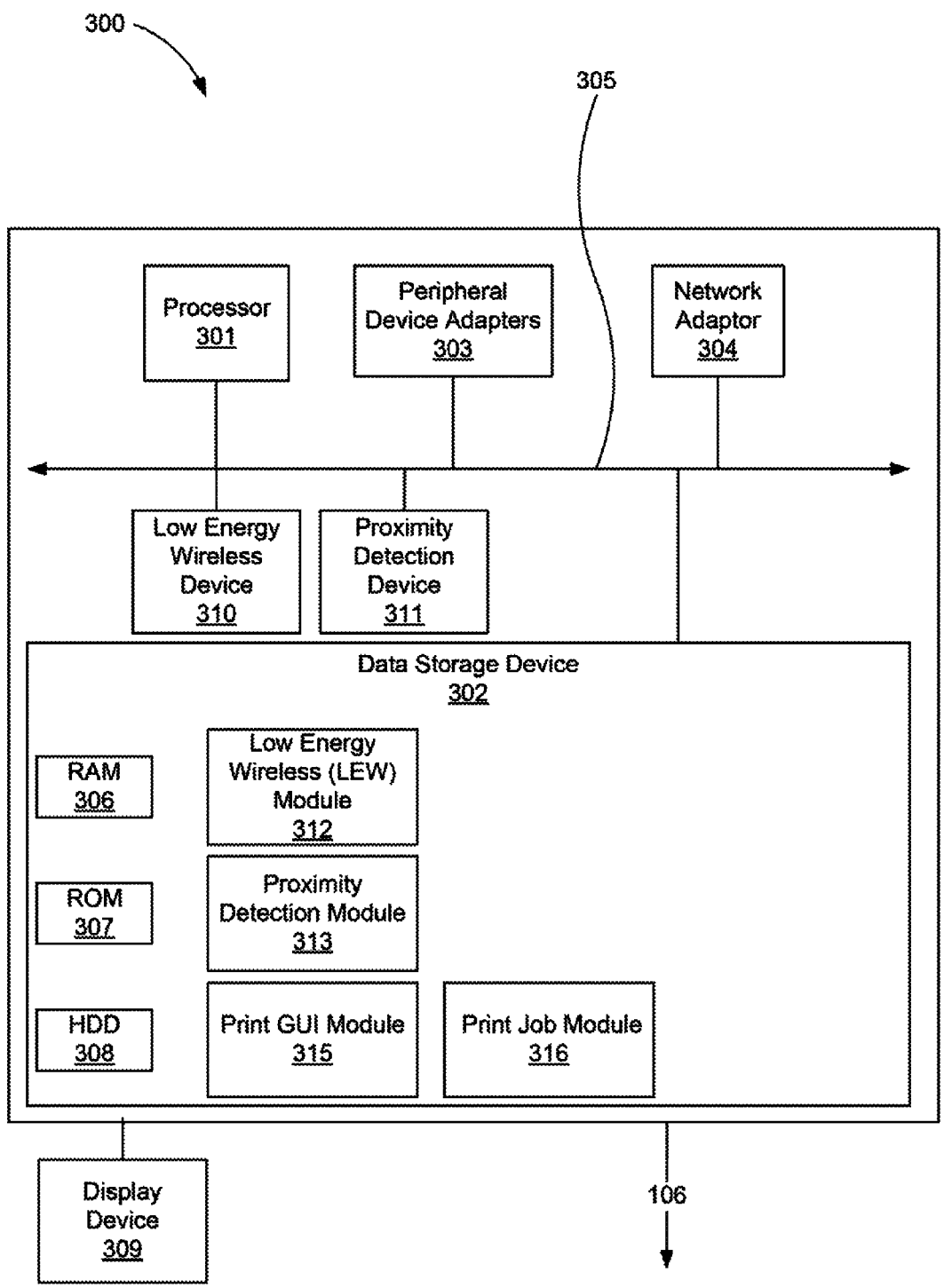
FIG. 3 is a diagram of a mobile computing device within the system of FIG. 1, according to one example of the principles described herein.

FIG. 2 is a diagram of a printing device (102a, 102b, 102c) (designated generally herein as 102) within the system (100) of FIG. 1, according to one example of the principles described herein. FIG. 3 is a diagram of a mobile computing device (103) within the system (100) of FIG. 1, according to one example of the principles described herein. Beginning with FIG. 2, to achieve its desired functionality, the printing device (102) includes various hardware components. Among these hardware components may be a number of processors (201), a number of data storage devices (202), a number of peripheral device adapters (203), and a number of network adapters (204). These hardware components may be interconnected through the use of a number of busses and/or network connections. In one example, the processor (201), data storage device (202), peripheral device adapters (203), and network adapters (204) may be communicatively coupled via a bus (205).

The processor (201) may include the hardware architecture to retrieve executable code from the data storage device (202) and execute the executable code. The executable code may, when executed by the processor (201), cause the processor (201) to implement at least the functionality of sending a number of announcement messages with a low energy wireless (LEW) device (210) within the printing device (102), determining the proximity of the mobile computing device (103) to the printing device (102), waking up the printing device (102) upon receiving a response to the announcement messages from a mobile computing device (103), creating an LEW connection with the mobile computing device, and creating a second connection between the printing device and the mobile computing device with a relatively higher data transfer speed than the LEW connection, charge a battery cell of the LEW device, among other functions, according to the methods of the present specification described herein. In the course of executing code, the processor (201) may receive input from and provide output to a number of the remaining hardware units.

The data storage device (202) may store data such as executable program code that is executed by the processor (201) or other processing device. As will be discussed, the data storage device (202) may specifically store computer code representing a number of applications that the processor (201) executes to implement at least the functionality described herein.

The data storage device (202) may include various types of memory modules, including volatile and nonvolatile memory. For example, the data storage device (202) of the present example includes Random Access Memory (RAM) (206), Read Only Memory (ROM) (207), and Hard Disk Drive (HDD) memory (208). Many other types of memory may also be utilized, and the present specification contemplates the use of many varying type(s) of memory in the data storage device (202) as may suit a particular application of the principles described herein. In certain examples, different types of memory in the data storage device (202) may be used for different data storage needs. For example, in certain examples the processor (201) may boot from Read Only Memory (ROM) (207), maintain nonvolatile storage in the Hard Disk Drive (HDD) memory (208), and execute program code stored in Random Access Memory (RAM) (206).

The hardware adapters (203, 204) in the printing device (102) enable the processor (201) to interface with various other hardware elements, external and internal to the printing device (102). For example, the peripheral device adapters (203) may provide an interface to input/output devices, such as, for example, display device (299), a mouse, or a keyboard. The peripheral device adapters (203) may also provide access to other external devices such as an external storage device, a number of network devices such as, for example, servers, switches, and routers, mobile computing devices, other types of computing devices, and combinations thereof.

The display device (209) may be provided to allow a user of the printing device (102) to interact with and implement the functionality of the printing device (102). The peripheral device adapters (203) may also create an interface between the processor (201) and the display device (209), another printing device, or other media output devices. The network adapter (204) may provide an interface to other computing devices within, for example, a network, thereby enabling the transmission of data between the printing device (102) and other devices located within the network.

The printing device (102) may, when executed by the processor (201), display the number of graphical user interfaces (GUIs) on the display device (209) associated with the executable program code representing the number of applications stored on the data storage device (202). The GUIs may include aspects of the executable code including providing user-interactive access to selection or modification of the functionality of the various devices within the system (100), selection of an LEW communication instance, notification of an LEW connection instance, selection of a non-LEW communication instance, and notification of a non-LEW connection instance, among other user-interactive functions. The GUIs may display, for example, an representation of what LEW connections are available between the printing device (102) and the mobile computing device (103), an indication as to whether an LEW connection has been established, a preliminary notification to a user as to which, among a number of the printing devices (102) a user may connect, representation of what non-LEW connections are available between the printing device (102) and the mobile computing device (103), an indication as to whether a non-LEW connection has been established, and options regarding the functionality of the printing device (102). Additionally, via making a number of interactive gestures on the GUIs of the display device (209), a user may wirelessly connect the printing device (102) to the mobile computing device (103) via LEW and non-LEW connections. Examples of display devices (109) include a touch screen integrated into the printing device (102), a computer screen, a laptop screen, a mobile device screen, a personal digital assistant (PDA) screen, and a tablet screen, among other display devices (209).

The printing device further includes a low energy wireless (LEW) device (210). The LEW device (210) may be incorporated into the printing device (102), or may be coupled to the printing device (210) as a peripheral device. The LEW device (210) provides connectivity between the printing device (102) and the mobile computing device (103). In one example, the LEW device (210) is a passive scanning device in which the LEW device (210) passively scans to find advertising devices such as the mobile computing device (103) within the radial communication range (FIG. 1, 104a, 104b, 104c) of the printing device (102). Passive scanning is not performed by active probing, but by listening to any data sent out by, in this example, the mobile computing device (103).

In another example, the LEW device (210) is an active scanning device in which the LEW device (210) actively scans by sending multiple probe requests and receiving response to the probe requests. In still another example, the LEW device (210) is both a passive and an active scanning device.

In one example, the LEW device (210) may establish and maintain an initial connection between the printing device (102) and the mobile computing device (103) upon transmission of a number of announcement messages from the printing device (102) and receiving a response (106) to the announcement messages from the mobile computing device (103). The LEW device (210) may also participate in a handover processes in which the type of connectivity used between the printing device (102) and the mobile computing device (103) changes from an LEW connection to a non-LEW connection. In this example, the handover processes would change the type of connectivity from an LEW connection to a non-LEW connection such as, for example, a BLUETOOTH® connection (non-BLUETOOTH® SMART or BLUETOOTH® SMART READY connection), any communication technology as defined under the Institute of Electrical and Electronics Engineers (IEEE) 802.11 standard, a near-field communication (NFC) connection, among other communication technologies, or combinations thereof.

As will be described in more detail below, the reason for the handover process is to provide the user with the ability to transmit data faster than the data transfer rate provided by an LEW connection. However, the LEW connection provides for a simple, power efficient, means of creating an initial communication instance between the printing device (102) and the mobile computing device (103) even when the printing device (102) is in sleep mode. This also reduces the overall energy consumption of the printing device (102), prolongs batter life for other portable and embedded systems of the printing device (102), reduces cooling requirements of the printing device (102), reduces noise that would otherwise be emitted by the printing device (102) if the printing device were to remain in a waked up mode, and generally reduces operating costs for energy and cooling of the printing device (102) if the printing device were to remain in a waked up mode.

The LEW device (210) may also send instructions to the printing device (102) in instances where the printing device (102) is in a sleep mode as mentioned above. In one example, the printing device (102) may be in a zero power sleep mode. A zero power sleep mode may be an ultra-low power sleep mode where no power (i.e., zero power) is applied to or drawn by the printing device (102) from an external power source such as, for example, an alternating current (AC) power source such as a wall outlet, and only the LEW device (210) is in an awake mode. Further, during a zero power sleep mode, the LEW device (210) draws power from an electrochemical power source (212). In one example, the electrochemical power source (212) is a rechargeable electrochemical cell such as a rechargeable battery electrically coupled to the LEW device (210). Entering the zero power sleep mode places the printing device (102) in a state where it is consuming no power (i.e., zero power) from the AC power source, until the printing device is woken up in order to connect to another device or in order to charge the electrochemical power source (212) associated with the LEW device (210) as will be described in more detail below.

In another example, the printing device (102) sleep mode may include the printing device (102) and all its sub-components including, for example network connection devices, wireless local area network (WLAN) connection devices, control panels, printing devices, being in a sleep mode except the LEW device (210). In this example, the LEW device (210) may be the device to send instructions to the printing device (102) in order to wake up a number of sub-components of the printing device (102) including up to the entire printing device (102) and all its sub-components. In still another example, the LEW device (210) sends instructions to the printing device (102) in order to wake up less than all of the sub-components of the printing device (102).

The LEW device (210) may also send a number of requests to the printing device (102) requesting electrical power be provided to a cell battery of the LEW device (210). The cell battery is depicted as an electrochemical power source (212) in FIG. 2. The electrochemical power source (212) may be integrated into the LEW device (210), or may be a separate element. Thus, in this example, the electrochemical power source (212) of the LEW device (210) is rechargeable, and may be charged from time to time. The LEW device (210) may send a request for the printing device (102) to recharge its electrochemical power source (212) via a power source (211) of the printing device (102) or another power source.

In one example, instructions to recharge the electrochemical power source (212) of the LEW device (210) may be sent by the LEW device (210) when the available charge within the electrochemical power source (212) drops below a minimum threshold. In another example, the LEW device (210) may send instructions to recharge the electrochemical power source (212) when the printing device (102) is in a sleep mode. In this example, the LEW device (210) may send request to the printing device (102) for the printing device (102) to wake up and begin recharging the electrochemical power source (212).

The printing device (102) further includes a proximity detection device (213). As described herein, the proximity detection device (213) may be used in connection with a number of announce messages sent from the printing device (102) via the LEW device (210) and/or a number of inquiries sent from the mobile computing device (103) to determine the distance between the printing device (102) and the mobile computing device (103).

In one example, the proximity detection device (213) may obtain data from another device such as the mobile computing device (103) or other printing devices as to the proximity of the mobile computing device (103) relative to the printing device (102). In this example, received signal strength indicator (RSSI) values, device transmit power levels, received channel power indicator (RCPI) values, or other communication metrics may be communicated to the printing device (102) from another device such as the mobile computing device (103) or other printing devices, and processed by the processor (201) to determine the proximity of the mobile computing device (103) relative to the printing device (102), another printing device, or combinations thereof. This information may be used to determine whether the printing device (102) should connect to the mobile computing device (103) or whether another printing device should instead connect to the mobile computing device (103).

The printing device (102) further includes a notification device (218). When a user is initially connecting to a printing device (102) among a number of printing devices that are co-located within a small area, it may be beneficial to indicate to the user which of the closely co-located printing devices (102) with which the user has begun communicating. The notification device (218) may be instructed by the processor (201) to announce to the user that the printing device (102) is the printing device among other printing devices to which the user should look to and begin interacting. The notification device (218) may be any type of device that would provide such a notification including a visual notification such as a blinking light or the turning on of the display device (209), an audible notification from an audio output device, a tactile notification such a vibration produced by a rumbler, among other forms of notification devices.

The printing device (102) further includes a number of modules used in the implementation of connecting a mobile computing device (103) to the printing device (102), transmitting data to the printing device (102) from the mobile computing device (103) for printing or other forms of processing, and printing or processing the transferred data. The various modules within the printing device (102) include executable program code that may be executed separately. In this example, the various modules may be stored as separate computer program products. In another example, the various modules within the printing device (102) may be combined within a number of computer program products; each computer program product including a number of the modules.

The printing device (102) may include a lose energy wireless (LEW) module (214) to, when executed by the processor (201), passively scan for advertising devices such as the mobile computing device (103) or actively scans for devices by sending a number of probe requests and receiving response to the probe requests from, for example, the mobile computing device (103). The LEW module (214) may further request the printing device (102) to wake up if the printing device is in a sleep mode. Still further, the LEW module (214) may assist in a handover process in which the wireless communication type used between the printing device (102) and the mobile computing device (103) is switched from an LEW communication type to a non-LEW communication type. Even still further, the LEW module (214) may request the printing device (102) to provide power form the power source (211) to the electrochemical power source (212) of the LEW device (210) to recharge the electrochemical power source (212) while the printing device (102) is in a wake up mode or after the LEW device (210) has requested the printing device (102) to wake up from a sleep mode.

The printing device (102) may further include a power control module (215) to, when executed by the processor (101), place the printing device (102) in a sleep mode after a threshold period of time. This will make the printing device (102) more power efficient, reduces cooling requirements of the printing device (102), reduces wear on a number of components of the printing device (102), reduces noise that would otherwise be emitted by the printing device (102) if the printing device were to remain in a waked up mode, and generally reduces operating costs for energy and cooling of the printing device (102) if the printing device were to remain in a waked up mode. The power module (215) further causes a number of components of the printing device (102) to wake up from a sleep mode upon receiving a request from the LEW device (210) to do so. Further, the power module (215) further charges the electrochemical power source (212) when requested by the LEW device (210).

The printing device (102) may include a proximity detection module (216) to, when executed by the processor (101), determines or receives from a separate device such as the mobile computing device (103) RSSI values, device transmit power level, RCPI values, and other communication metrics. The proximity detection module (216) may use these communication metrics to determine whether the printing device (102) should connect to the mobile computing device (103) as described herein.

The printing device (102) may further include a print module (217) to, when executed by the processor (101), cause the printing device (102) to render human-readable representations of graphics or text on paper as well as performing additional auxiliary functions such as faxing documents, creating and transmitting emails, photocopying documents, and scanning documents.

FIG. 3 is a diagram of a mobile computing device (103) within the system (100) of FIG. 1, according to one example of the principles described herein. The mobile computing device may be a mobile phone, a smart phone, a tablet computing device, a portable computing device, a laptop computing device, a personal digital assistant (PDA), or a wearable computing device, among other types of mobile computing devices.

To achieve its desired functionality, the mobile computing device (103) includes various hardware components. Among these hardware components, like the printing device (102), may be a number of processors (301), a number of data storage devices (302), a number of peripheral device adapters (303), and a number of network adapters (304). These hardware components may be interconnected through the use of a number of busses and/or network connections. In one example, the processor (301), data storage device (302), peripheral device adapters (303), and a network adapter (304) may be communicatively coupled via a bus (305).

The processor (301) may include the hardware architecture to retrieve executable code from the data storage device (302) and execute the executable code. The executable code may, when executed by the processor (301), cause the processor (301) to implement at least the functionality of detecting or sending a low energy wireless (LEW) signal from and to a number of printing devices (102), respectively.

The executable code may also, when executed by the processor (301), cause the processor (301) to determine or receive from a separate device such as the printing device (102) RSSI values, device transmit power level, RCPI values, and other communication metrics to determine the proximity of a number of printing devices (102), determine whether to connect to a number of printing devices (102) based on the communication metrics, and determine which printing device (102) among a number of printing devices to connect to based on the communication metrics. The executable code may, when executed by the processor (301), also cause the processor (301) to implement at least the functionality of displaying a number of graphical user interfaces (GUIs) to assist the user in selection of a printing device (102) to connect to, select a number of print parameters, and create and transmit a print job to the printing device (103). The functionality of the processor (301) is provided according to the methods of the present specification described herein. In the course of executing code, the processor (301) may receive input from and provide output to a number of the remaining hardware units.

The data storage device (302) may store data such as executable program code that is executed by the processor (301) or other processing device. As will be discussed, the data storage device (302) may specifically store computer code representing a number of applications that the processor (301) executes to implement at least the functionality described herein.

The data storage device (302) of the mobile computing device (103) may include various types of memory modules, including volatile and nonvolatile memory. For example, the data storage device (302) of the present example includes Random Access Memory (RAM) (306), Read Only Memory (ROM) (307), and Hard Disk Drive (HDD) memory (308). Many other types of memory may also be utilized, and the present specification contemplates the use of many varying type(s) of memory in the data storage device (102) as may suit a particular application of the principles described herein. In certain examples, different types of memory in the data storage device (302) may be used for different data storage needs. For example, in certain examples the processor (301) may boot from Read Only Memory (ROM) (307), maintain nonvolatile storage in the Hard Disk Drive (HDD) memory (308), and execute program code stored in Random Access Memory (RAM) (306).

The hardware adapters (103, 104) in the mobile computing device (103) enable the processor (301) to interface with various other hardware elements, external and internal to the mobile computing device (103). For example, the peripheral device adapters (303) may provide an interface to input/output devices, such as, for example, display device (309), a mouse, or a keyboard. The peripheral device adapters (303) may also provide access to other external devices such as an external storage device, a number of network devices such as, for example, servers, switches, and routers, mobile devices, other types of computing devices, and combinations thereof.

The display device (309) may be provided to allow a user of the mobile computing device (103) to interact with and implement the functionality of the mobile computing device (103). The peripheral device adapters (303) may also create an interface between the processor (301) and the display device (309), a printing device (102), or other media output devices. The network adapter (304) may provide an interface to other computing devices within, for example, a network, thereby enabling the transmission of data between the mobile computing device (103) and other devices located within the network.

The mobile computing device (103) may, when executed by the processor (301), display the number of graphical user interfaces (GUIs) on the display device (309) associated with the executable program code representing the number of applications stored on the data storage device (302). The GUIs may include aspects of the executable code including the display within a GUI of a number of available printing devices (102), user-interactive selection of a number of the available printing devices (102), display within a GUI of a number of available LEW and non-LEW connections, user-interactive selection of a number of the available LEW and non-LEW connections, and display within a GUI of a number of printing options and commands. Additionally, via making a number of interactive gestures on the GUIs of the display device (309), a user may detect the proximity of a number of printing devices (102), connect to LEW and non-LEW networks, participate in a handover process from an LEW to a non-LEW connection, choose a number of printing options for a print job the user desires to print or otherwise process, and send a print job to a selected printing device (102). Examples, of display devices (309) include a touch screen, a smart phone screen, a computer screen, a laptop screen, a mobile device screen, a personal digital assistant (PDA) screen, and a tablet screen, among other display devices (309). Examples of the GUIs displayed on the display device (109), will be described in more detail below.

The mobile computing device (103) may include a low energy wireless (LEW) device (310). The LEW device (310) of the mobile computing device (103) provides connectivity between the mobile computing device (102) and the printing device (102) upon transmission of a number of announcement messages from the printing device (102) and receiving a response (106) to the announcement messages from the mobile computing device (103). In one example, the LEW device (310) is a passive scanning device in which the LEW device (310) passively scans to find advertising devices such as the printing device (203) as the mobile computing device (103) comes within the radial communication range (FIG. 1, 104a, 104b, 104c) of the printing device (102). Passive scanning is not performed by active probing, but by listening to any data sent out by, in this example, the printing, device (102).

In another example, the LEW device (310) is an active scanning device in which the LEW device (310) actively scans by sending multiple probe requests and receiving response to the probe requests. In still another example, the LEW device (310) is both a passive and an active scanning device.

In one example, the LEW device (310) may establish and maintain an initial connection between the mobile computing device (103) and the printing device (102), and also participate in a handover processes in which the type of connectivity used between the mobile computing device (103) and the printing device (102) changes from an LEW connection to a non-LEW connection. In this example, the handover processes would change the type of connectivity from an LEW connection to a non-LEW connection such as, for example, a BLUETOOTH® connection (non-BLUETOOTH® SMART or BLUETOOTH® SMART READY connection), any communication technology as defined under the Institute of Electrical and Electronics Engineers (IEEE) 802.11 standard, a near-field communication (NEC) connection, among other communication technologies, or combinations thereof.

The LEW device (310) may also send instructions to the printing device (102) in instances where the printing device (102) is in a sleep mode as mentioned above. In this example, the LEW device (310) may be the device to send instructions to the LEW device (210) of the printing device (102) in order to wake up a number of sub-components of the printing device (102) including up to the entire printing device (102) and all its sub-components or less than all of the sub-components of the printing device (102).

The mobile computing device (103) further includes a proximity detection device (313). As described herein, the proximity detection device (313) may be used in connection with a number of inquiries sent from the mobile computing device (103) via the LEW device (310) of the mobile computing device (103) to determine the distance between the printing device (102) and the mobile computing device (103) and/or a number of announce messages sent from the printing device (102) via the LEW device (210).

In one example, the proximity detection device (313) may generate signal strength indicator (RSSI) values, device transmit power levels, received channel power indicator (RCPI) values, or other communication metrics to determine the distance between the printing device (102) and the mobile computing device (103). In another example, the proximity detection device (313) may obtain data from another device such as the printing device (102) or other printing devices as to the proximity of the mobile computing device (103) relative to the printing device (102) or other printing devices. In this example, the RSSI values, device transmit power levels, RCPI values, or other communication metrics may be communicated to the mobile computing device (103) from another device such as the printing device (102) or other printing devices, and processed by the processor (301) to determine the proximity of the mobile computing device (103) relative to the printing device (102), another printing device, or combinations thereof. This information may be used to determine whether the mobile computing device (103) should connect to the printing device (102) or whether the mobile computing device (103) should instead connect to another printing device.

The mobile computing device (103) further includes a number of modules used in the implementation of the various processes described herein. The various modules within the mobile computing device (103) include executable program code that may be executed separately. In this example, the various modules may be stored as separate computer program products. In another example, the various modules within the mobile computing device (103) may be combined within a number of computer program products; each computer program product including a number of the modules.

The mobile computing device (103) may include a low energy wireless (LEW) module (312) to, when executed by the processor (301), passively scan for advertising devices such as the printing device (102) or actively scans for devices by sending a number of probe requests and receiving response to the probe requests from, for example, the printing device (102). The LEW module (312) may further send a request to the LEW device (FIG. 2, 214) of the printing device (102) requesting the printing device (102) to wake up if the printing device is in a sleep mode. Still further, the LEW module (312) may assist in a handover process in which the wireless communication type used between the mobile computing device (103) and the printing device (102) is switched from an LEW communication type to a non-LEW communication type.

The mobile computing device (103) may further include a proximity detection module (215) to, when executed by the processor (301), determine or receive from a separate device such as the printing device (102) RSSI values, device transmit power level, RCPI values, and other communication metrics. The proximity detection module (313) may use these communication metrics to determine whether the mobile computing device (103) should connect to the printing device (102) as described herein.

The mobile computing device (103) may further include a print graphical user interface (GUI) module (315) to, when executed by the processor (301), present a number of GUIs for user interaction. The GUIs may present user-interactive options regarding the selection of a printing device (102) among a number of printing devices to which the mobile computing device (103) may connect. The GUIs may also provide information regarding the identity of a printing device (102) to which the user has requested to connect. Further, the GUIs may provide information regarding a number of functions of the printing devices (102) and user-selectable options regarding the functions. These printing device function GUIs provided by the print GUI module (315) may be presented before, after, or before and after the user has selected a particular printing device (102) among the number of printing devices. This allows the user to identify a printing device (102) among the number of printing devices that provides a desired functionality as opposed to other printing devices (102) that may not provide that particular functionality. This also allows the user to make selections regarding printing options of a printing device (102) after the user has selected that particular printing device (102).

The print GUI module (315) may also assist in the handover process described herein in which the wireless communication type used between the mobile computing device (103) and the printing device (102) is switched from an LEW communication type to a non-LEW communication type.

The mobile computing device (103) may further include a print job module (316) to, when executed by the processor (101), create and transmit a print job from the mobile computing device (103) to a printing device (102). The print job module (316) may create a print job based on print options selected by the user when interacting with the print GUI module (315).

Figure 4:
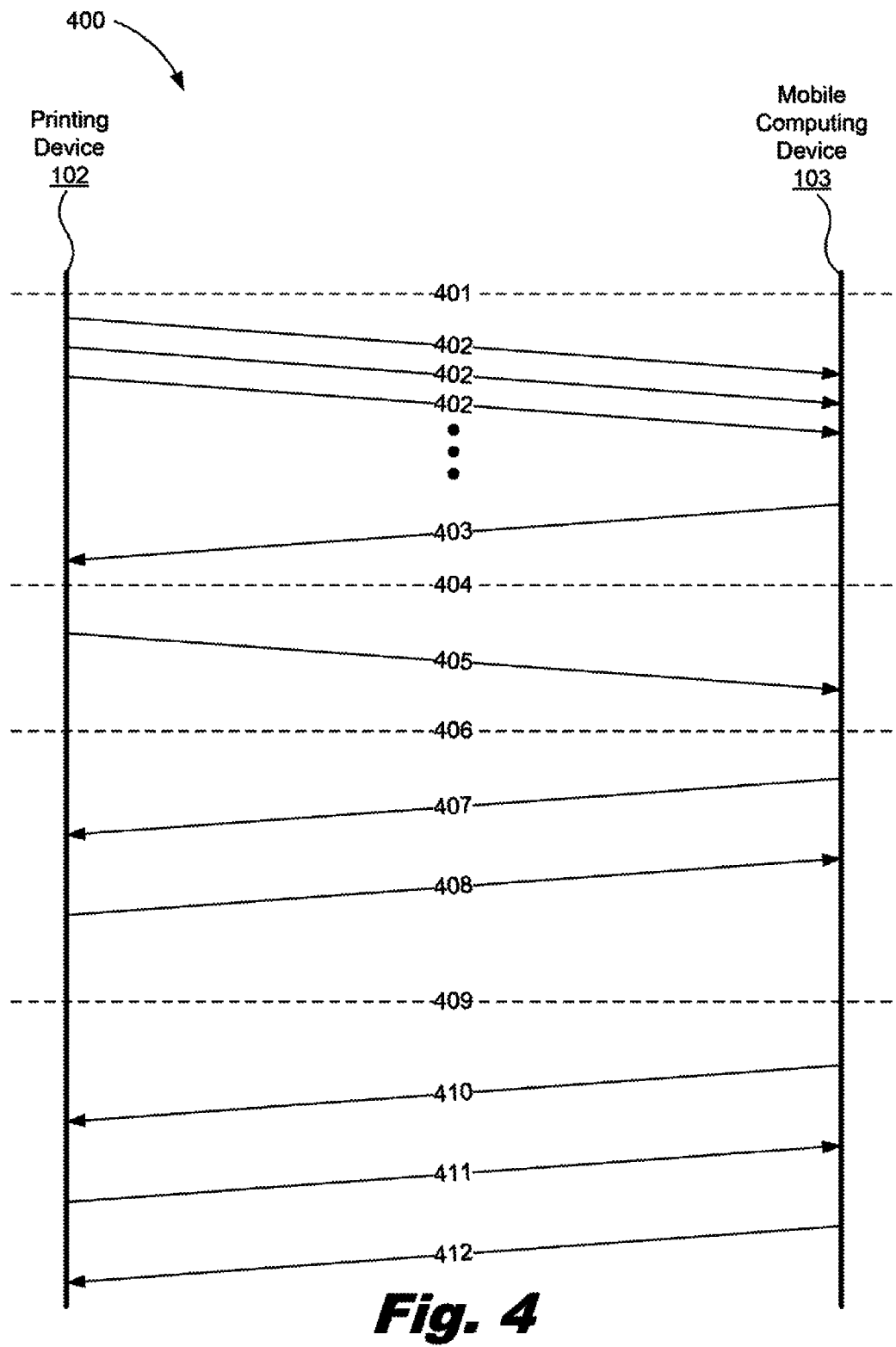
FIG. 4 is a message sequence diagram of a method of printing device discovery utilizing a wake up process for the printing device, according to one example of the principles described herein.

Having described the print devices (102) and the mobile communication device (103), FIG. 4 may now be described. FIG. 4 is a message sequence diagram (400) of a method of printing device (102) discovery utilizing a wake up process for the printing device (102), according to one example of the principles described herein. The left bar of the message sequence diagram of FIG. 4 represents the printing device (102), and the right bar of the message sequence diagram represents the mobile computing device (103). The same convention applies to the message sequence diagrams of FIGS. 5 and 6 described in more detail below.

In the example of FIG. 4, a printing device (102) is in a sleep mode (401). A sleep mode (401) is a state of the printing device (102) in which a number of sub-components of the printing device (102) including up to the entire printing device (102) and all its sub-components except for the low energy wireless (LEW) device (FIG. 2, 210) are powered off or in a low power state. In the sleep mode (401), the printing device (102) consumes some power while sleeping in order to power the RAM (FIG. 2, 206), and to be able to respond to a wake-up request sent by, for example, the LEW device (FIG. 2, 210). In the sleep mode (401), the printing device (102) is able to consume much less power as compared to when the printing device (102) is in a woken-up state.

While the printing device (104) is in the sleep mode (401), the LEW device (FIG. 2, 210) of the printing device (102) may, in one example, send a number of advertisement messages (402). In one example, the advertisement messages (402) may be sent by the LEW device (FIG. 2, 210) once every minute or less. In another example, the advertisement messages (402) may be sent once every second or less. In still another example, the advertisement messages (402) may be sent continually. Because, the LEW device (FIG. 2, 210) of the printing device (102) utilizes the low energy wireless protocols, it is capable of broadcasting the advertisement messages (402) without drawing power from the printing device (FIG. 2, 102) or its power source (FIG. 2, 211).

The mobile computing device (103) may be continually scanning for the advertisement messages (402). As the mobile computing device (103) continually scans for the advertisement messages (402), the mobile computing device (103) may be brought by a user into the radial communication range (FIG. 1, 104a, 104b, 104c) of one or more of the printing devices (102a, 102b, 102c). In response to receiving one of the advertisement messages (402) sent by the printing device (102), the mobile computing device (103) may send an inquiry (403) to the LEW device (FIG. 2, 210) of the printing device (102). The inquiry (403) is received by the LEW device (FIG. 2, 210), and the LEW device (FIG. 2, 210) sends instructions to the printing device (102) to wake up based on the receipt of the inquiry (403).

The printing device (102) wakes up (404) and sends an announce message (405). The announce message (405) is broadcast to other devices including the mobile computing device (103) if those devices are within the radial communication range (104a, 104b, 104c) of the printing device (102) and the broadcast range of the LEW device (FIG. 2, 210). The mobile computing device (103), the printing device (102) or both determine a distance between each other using the LEW devices (FIG. 2, 210, FIG. 3, 310), and RSSI values, device transmit power levels, RCPI values, and other communication metrics described herein. The method of FIG. 4 continues by transferring information regarding how to complete a handover process (406) to establish a non-LEW connection such as a wireless local area network (LWAN) connection between the printing device (102) and the mobile computing device (103) in place of the LEW connection provided by the LEW devices (FIG. 2, 210, FIG. 3, 310).

In one example, the handover process (406) may be performed autonomously without user interaction. In this example, the handover (406) from the LEW network to the non-LEW network may be performed without the user's knowledge. In another example, the handover process (406) may be performed with some level of user interaction. In this example, the user interaction may include, for example, providing notification to the user of the handover via the printing device (102) the mobile computing device (103), or both. Further, the user interaction may include providing a user interactive GUI on the mobile computing device (103) in which the user may select a non-LEW network such as the LWAN provide by the network adapter (FIG. 2, 204).

In one example, the mobile computing device (103) may be in a radial communication range (104a, 104b, 104c) of the LEW network as well as the relatively larger range of the WLAN network. In this example, the mobile computing device (103) may interpolate between the LEW network and the WLAN network, and, using the RSSI values, device transmit power level, RCPI values, and other communication metrics, pick, for example, printing device (102b) as opposed to printing device (102a) based on the fact that the mobile computing device (103) is closer to printing device (102b) than printing device (102a) as determined by the communication metrics.

In another example, the mobile computing device (103) may be located in an overlapping area (FIG. 1, 105a, 105b) where the radial communication range (104a, 104b, 104c) of LEW devices (FIG. 2, 210) of two or more printing devices (102) overlap. A user of the mobile computing device (103) may choose, for example, between utilizing printing device (102a) and printing device (102b) if the mobile computing device (103) is located in the overlapping area (105a). In this example, a printing device selection GUI may be presented to the user on the mobile computing device (103) that allows the user to select either printing device (102a) or printing device (102b). In another example, the user may also choose either printing device (102a) or printing device (102b) by moving closer to one of the two printing devices (102a, 102b) that the user chooses. The mobile computing device (103) may sense this movement, and interpret the movement as a selection of one printing device (102) over another. In still another example, the user may interact with the printing device (102) by, for example, touching a button on the printing device (102) to indicate that the printing device (102) with which the user has interacted is the printing device (102) the user chooses. In still another example, confirmation of a printing device (102) as being the chosen printing device (102) may come in the form of a notification on the mobile computing device (103) or the printing device (102). In still another example, confirmation of a printing device (102) as being the chosen printing device (102) may come in the form of a visual notification such as a blinking light or the turning on of the display device (209) of the printing device (102), an audible notification from an audio output device of the printing device (102), a tactile notification such a vibration produced by a rumbler device of the printing device (102), among other forms of notification devices.

The mobile computing device (103) sends a probe request (407), specified by the service set identifier (SSID), to the printing device (102) requesting information from the printing device (102). The information requested in the probe request (407) may include information regarding connecting to the printing device (102) via a wireless local area network (WLAN). In this manner, the mobile computing device (103) is able to determine what WLAN networks are within the proximity of the mobile computing device (103), and which of the number of WLANs are used by the printing device (102) in transmitting data between itself and other devices such as the mobile computing device (103).

In one example, the mobile computing device (103) sends the probe request (407), specified by a broadcast SSID, to a plurality of the printing devices (102). The probe request (407) is a form of active discovery performed by the mobile computing device (103) in order to establish communication with the printing device (102) via a WLAN network.

The printing devices (102) receiving the probe request (407) determines if the mobile computing device (103) has at least one compatible data rate. If the mobile computing device (103) does have at least one compatible data rate, a probe response (408) is sent by the printing device (102) to the mobile computing device (103). The probe response (408) includes, for example, an SSID (i.e., the wireless network name), an internet protocol (IP) address of the printing device (102), a Media Access Control (MAC) address of the printing device (102), a Universally Unique Identifier (UUID) of the printing device (102), other identification metrics of the printing device (102), or combinations thereof. The probe response (408) also includes supported data rates, encryption types if required, and other capabilities of the printing device (102) defined under the IEEE 802.11 standard.

A WLAN network connection is confirmed at 408. In one example, the mobile computing device (103) sends an authentication request to the printing device (102). The printing device (102) receives the authentication request and responds to the mobile computing device (102) with an authentication response. The mobile computing device (103) may also send an association request to the printing device (102). The association request may contain encryption data and other capabilities of the mobile computing device (103) defined under the IEEE 802.11 standard. The printing device (102) may then create an association ID for the mobile computing device (103) and respond to the association request with an association response granting access WLAN access to the mobile computing device (103).

With the mobile computing device (103) successfully authenticated and associated with the WLAN on which the printing device (102) is connected and a WLAN network connection is confirmed at 409, the mobile computing device (103) may send a discovery query (410). The discovery query (410) includes a request for information associated with the services provided by the printing device (102). The printing device (102) sends a discovery response (411). Data such as a print job request (412) may be transferred from the mobile computing device (103) to the printing device (102), and the user may obtain the printed document from the printing device (102) to which the mobile computing device (103) is connected. Throughout the disclosure, the mobile computing device (103) may execute a print-capable application that allows the mobile computing device (103) to select a printing device, and create and send print jobs to the printing device (103). In selecting the printing device (102), the print-capable application of the mobile computing device (103) may present a list of available printing devices (102) to which a print job may be sent. In this example, the list of available printing devices (102) may identify which printing devices (102) within the list are LEW capable using an icon, listing the LEW capable printing devices (102) first, or through other distinguishing methods.

Thus, the LEW device (FIG. 2, 210) is used in communicating with the mobile computing device (103) between elements 401 and 406 using an LEW network. After the handover process (408), the printing device (102) is communicating with the mobile computing device (103) using a WLAN or other non-LEW network. The method of FIG. 4 may be performed in connection with any number of printing devices (201) within the system (100) that may be able to connect to the mobile computing device (103).

Figure 5:
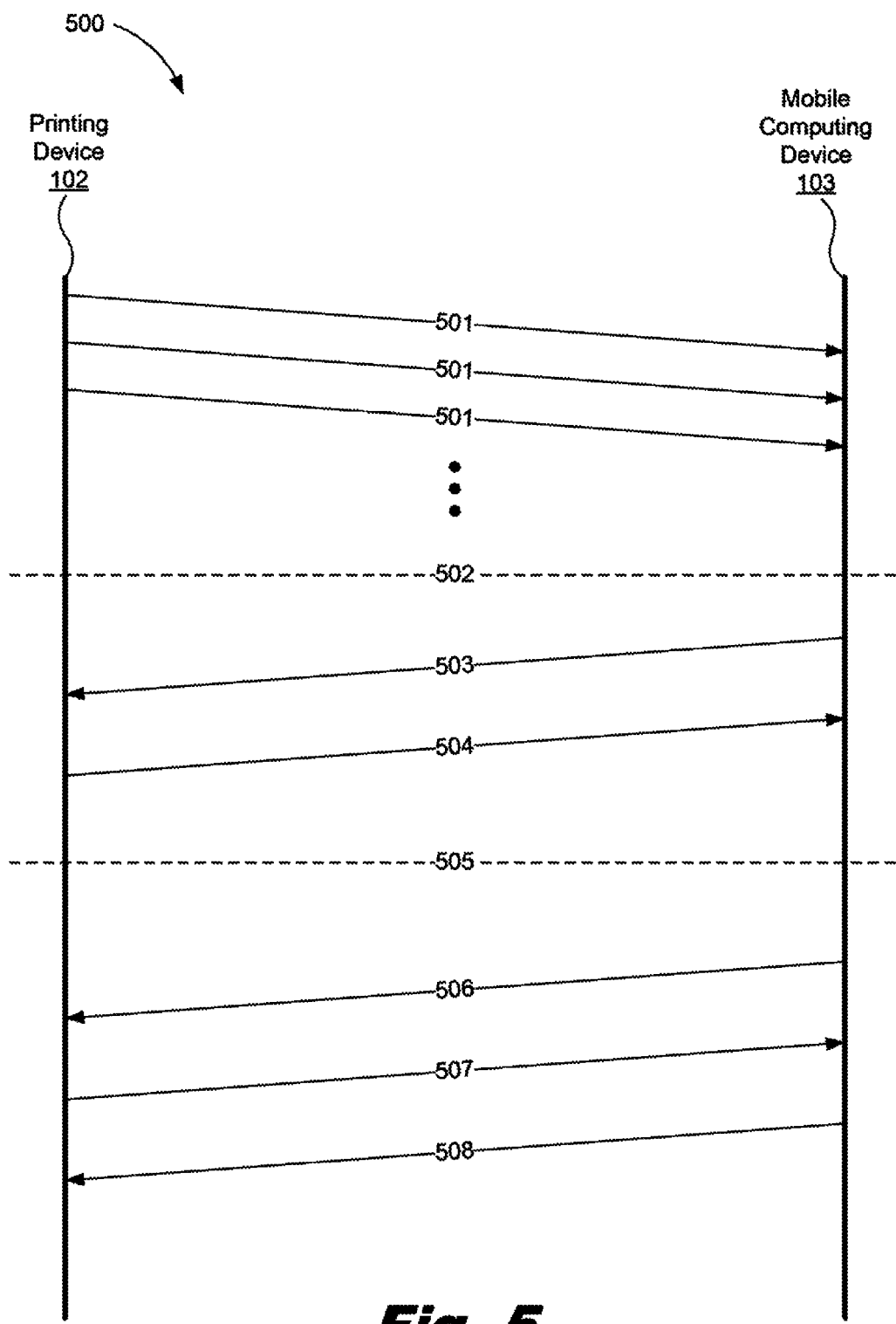
FIG. 5 is a message sequence diagram of a method of printing device discovery in a case where a mobile computing device has previously connected to a network of the printing device, according to one example of the principles described herein.

FIG. 5 is a message sequence diagram (500) of a method of printing device discovery in a case where a mobile computing device has previously connected to a network of the printing device, according to one example of the principles described herein. The message sequence diagram (500) of FIG. 5 may begin with the printing device, in a woken up mode, broadcasting a number of announce messages (501). The announce messages (501) broadcast to other devices including the mobile computing device (103) if those devices are within the radial communication range (104a, 104b, 104c) of the printing device (102) and the broadcast range of the LEW device (FIG. 2, 210). The mobile computing device (103), the printing device (102) or both determine a distance between each other using the LEW devices (FIG. 2, 210, FIG. 3, 310), and RSSI values, device transmit power levels, RCPI values, and other communication metrics described herein. The method of FIG. 4 continues by transferring information regarding how to complete a handover process (502) as described above in connection with element 406 of FIG. 4.

The mobile computing device (103) sends a probe request (503), specified by the SSID, to the printing device (102) requesting information from the printing device (102) as described above in connection with element 407 of FIG. 4. The information requested in the probe request (407) may include information regarding connecting to the printing device (102) via a wireless local area network (WLAN). In this manner, the mobile computing device (103) is able to determine what WLAN networks are within the proximity of the mobile computing device (103), and which of the number of WLANs are used by the printing device (102) in transmitting data between itself and other devices such as the mobile computing device (103).

The printing devices (102) receiving the probe request (407) determines if the mobile computing device (103) has at least one compatible data rate. If the mobile computing device (103) does have at least one compatible data rate, a probe response (504) is sent by the printing device (102) to the mobile computing device (103) as described above in connection with element 408 of FIG. 4. A WLAN network connection is confirmed at 505.

In one example, the mobile computing device (103) sends an authentication request to the printing device (102). The printing device (102) receives the authentication request and responds to the mobile computing device (103) with an authentication response. The mobile computing device (103) may also send an association request to the printing device (102). The association request may contain encryption data and other capabilities of the mobile computing device (103) defined under the IEEE 802.11 standard. The printing device (102) may then create an association ID for the mobile computing device (103) and respond to the association request with an association response granting access WAN access to the mobile computing device (103).

With the mobile computing device (103) successfully authenticated and associated with the WLAN on which the printing device (102) is connected and a WLAN network connection is confirmed at 505, the mobile computing device (103) may send a discovery query (506) as described above in connection with element 410 of FIG. 4. The printing device (102) sends a discovery response (507), and data such as a print job request (508) may be transferred from the mobile computing device (103) to the printing device (102).

Thus, the LEW device (FIG. 2, 210) is used in communicating with the mobile computing device (103) between elements 501 and 502 using an LEW network. After the handover process (502), the printing device (102) is communicating with the mobile computing device (103) using a WLAN or other non-LEW network. The method of FIG. 5 may be performed in connection with any number of printing devices (201) within the system (100) that may be able to connect to the mobile computing device (103).

Further, the method depicted in FIG. 5 provides for the mobile computing device (103) to connect to a printing device (102) in a situation where the mobile computing device (103) is recognized by the WLAN network due to the known credentials of the mobile computing device (103). Thus, a handover process (502) may take place in switching between an LEW network and a non-LEW network such as a WLAN in order to provide a faster network in the non-LEW network to transfer date such as the print job (508) from the mobile computing device (103) to the printing device (102).

Figure 6:
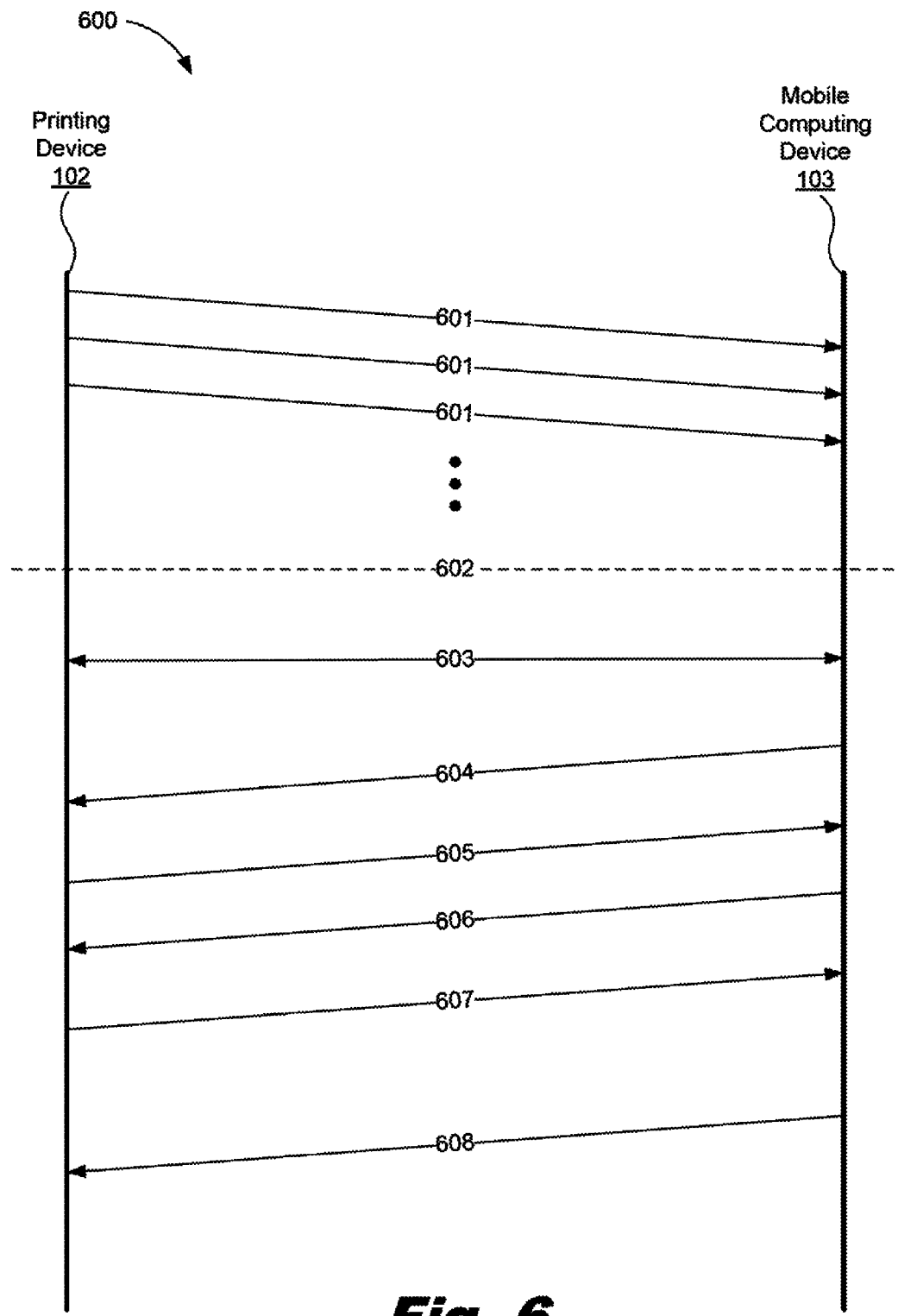
FIG. 6 is a message sequence diagram of a method of printing device discovery in a case where a mobile computing device has not previously connected to a network of the printing device, according to one example of the principles described herein.

FIG. 6 is a message sequence diagram (600) of a method of printing device discovery in a case where a mobile computing device has not previously connected to a network of the printing device, according to one example of the principles described herein. The message sequence diagram (600) of FIG. 6 uses a WI-FI protected setup protocol (WPS) to connect a mobile computing device (103) to the printing device (102) in a situation where the mobile computing device (103) has never before connected to the printing device (102) or the WLAN. In one example, this method may use a WI-FI DIRECT standard developed by the Wi-Fi Alliance.

The message sequence diagram (600) of FIG. 6 may begin with the printing device, in a woken up mode, broadcasting a number of announce messages (601). The announce messages (601) broadcast to other devices including the mobile computing device (103) if those devices are within the radial communication range (104a, 104b, 104c) of the printing device (102) and the broadcast range of the LEW device (FIG. 2, 210). The mobile computing device (103), the printing device (102) or both determine a distance between each other using the LEW devices (FIG. 2, 210, FIG. 3, 310), and RSSI values, device transmit power levels, RCPI values, and other communication metrics described herein. The method of FIG. 4 continues by transferring information regarding how to complete a handover process (602) as described above in connection with element 406 of FIG. 4.

A WPS protocol may be invoked between the printing device (102) and the mobile computing device (103). The WPS protocol includes as a series of extensible authentication protocol (EAP) message exchanges between the mobile computing device (103) and the printing device (102) that are triggered by a user action and relies on an exchange of descriptive information that precedes that users action.

The mobile computing device (103) may send an association request (604) to the printing device (102). The association request may contain encryption data and other capabilities of the mobile computing device (103) defined under the IEEE 802.11 standard. The printing device (102) may then create an association ID for the mobile computing device (103) and respond to the association request (604) with an association response (605) granting access WLAN access to the mobile computing device (103). The mobile computing device (103) also sends an authentication request (606) to the printing device (102). The printing device (102) receives the authentication request (606) and responds to the mobile computing device (103) with an authentication response (607). Data such as a print job request (508) may be transferred from the mobile computing device (103) to the printing device (102).

In the examples described in connection with FIGS. 4 through 6, the WLAN device depicted by the network adapter (FIG. 2, 204), during a wake up mode, is placed in a high power mode such that the WLAN network covers a relatively larger area than the radial communication range (104a, 104b, 104c) provided by the LEW device ((FIG. 2, 210) and its produced low energy network. This ensures good connectivity via the WLAN network, while still providing for a level of connectivity when the printing device (102) is in a sleep mode with the LEW device (FIG. 2, 210) being the only device within the printing device (102) that is awake.

In FIG. 6, the LEW device (FIG. 2, 210) is used in communicating with the mobile computing device (103) between elements 601 and 602 using an LEW network. After the handover process (602), the printing device (102) is communicating with the mobile computing device (103) using a WLAN or other non-LEW network. The method of FIG. 6 may be performed in connection with any number of printing devices (201) within the system (100) that may be able to connect to the mobile computing device (103).

Figure 7:
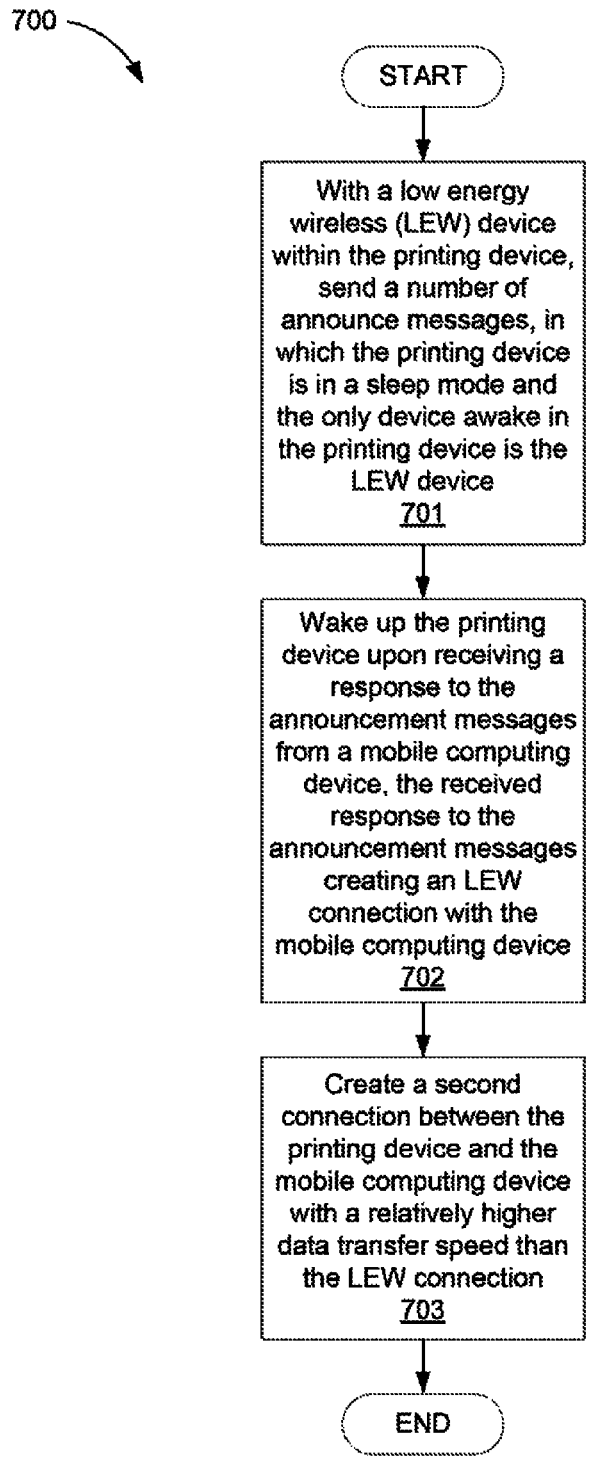
FIG. 7 is a flowchart showing a method of printing device discovery, according to one example of the principles described herein.

FIG. 7 is a flowchart (700) showing a method of printing device discovery, according to one example of the principles described herein. The method (700) may begin by, with a low energy wireless (LEW) device (FIG. 2, 210) within the printing device (102), sending (block 701) a number of announcement messages (401), in which the printing device (102) is in a sleep mode and the only device awake in the printing device (102) is the LEW device (FIG. 2, 205). The announcement messages may include a number of secondary connection information elements, a service set identifier (SSID) of the printing device, an Internet protocol (IP) address of the printing device, a Media Access Control (MAC) address, or a Universally Unique Identifier (UUID), or combinations thereof.

The method may continue by waking up (block 702) the printing device (102) upon receiving a response to the announcement messages (401) from a mobile computing device (103), the received response to the announcement messages creating an LEW connection with the mobile computing device (103). A second connection may be created (block 403) between the printing device (102) and the mobile computing device (103) with a relatively higher data transfer speed than the LEW connection.

Figure 8:
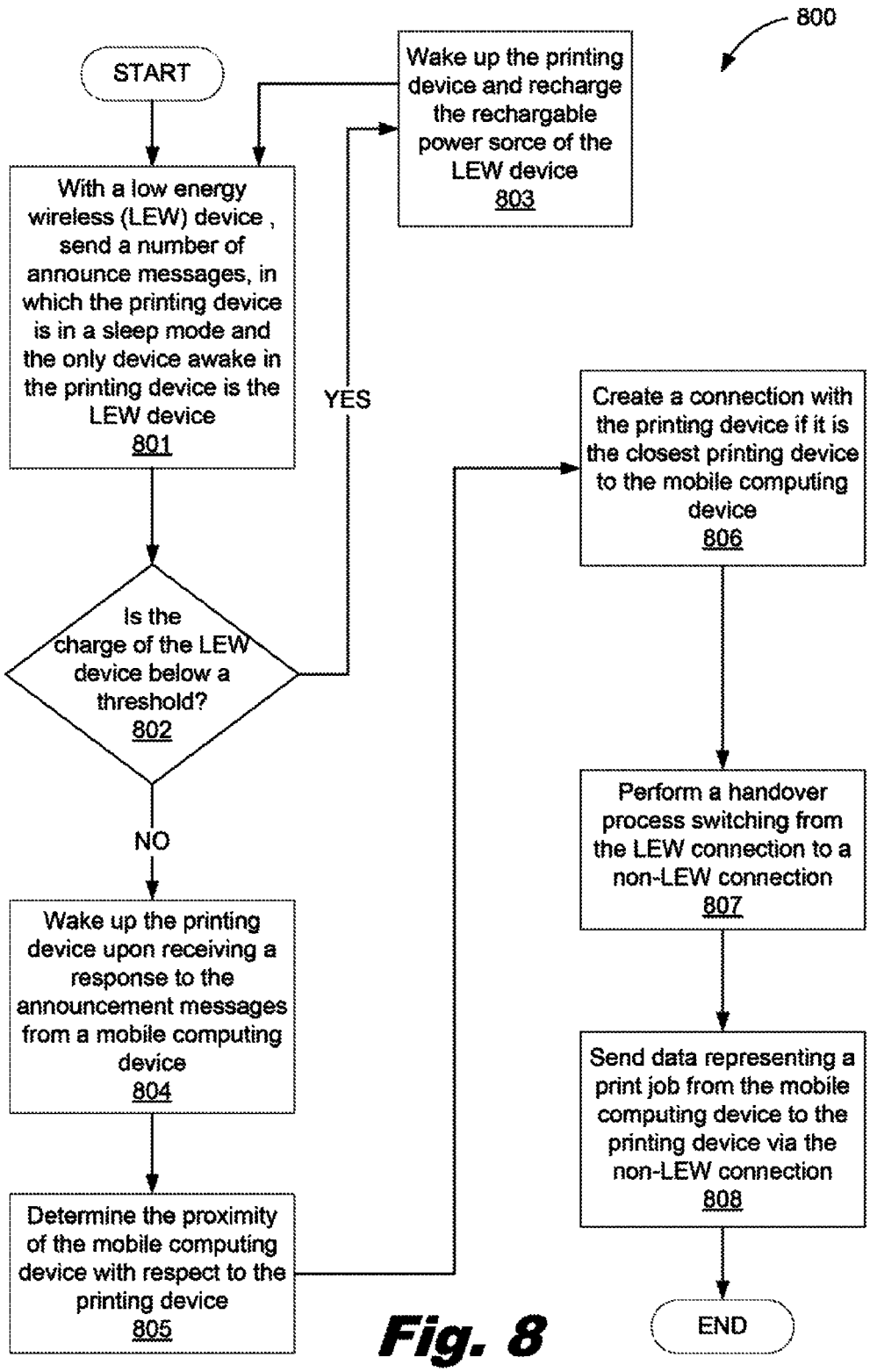
FIG. 8 is a flowchart showing a method of printing device discovery, according to another example of the principles described herein.

FIG. 8 is a flowchart (800) showing a method of printing device discovery, according to another example of the principles described herein. The method (800) may begin by, with a low energy wireless (LEW) device (FIG. 2, 210) within the printing device (102), sending (block 801) a number of announcement messages (401), in which the printing device (102) is in a sleep mode and the only device awake in the printing device (102) is the LEW device (FIG. 2, 205). The LEW device (802) determines (block 802) if the charge of a electrochemical power source (FIG. 2, 212) has dropped below a minimum threshold. If the charge of the electrochemical power source (FIG. 2, 212) has dropped below the threshold (block 802, determination YES), then the LEW device (FIG. 2, 210) instructs (block 803) the printing device (102) to wake up and begin to recharge the electrochemical power source (FIG. 2, 212) of the LEW device (FIG. 2, 210). Recharging at block 803 may continue until the available charge in the electrochemical power source (FIG. 2, 212) meets or exceeds a maximum threshold. In one example, the maximum threshold may be a full charge. The process may return to block 801, where the printing device (102) returns to a sleep mode, and the process begins again. If the charge of the electrochemical power source (FIG. 2, 212) has not dropped below the threshold (block 802, determination NO), then the process continues to block 804.

At block 804, the printing device (102) wakes up upon receiving a response to the announcement messages (401) from a mobile computing device (103), the received response to the announcement messages creating an LEW connection with the mobile computing device (103). The printing device (102), the mobile computing device (103), or both determine (block 805) the proximity of the mobile computing device (103) with respect to the printing device (102). A connection is created (block 806) between the printing device (102) and the mobile computing device (103) if it is determined that the printing device (102) is the closest printing device to the mobile computing device (103).

A handover process is performed (block 807) to switch from the LEW connection provided by the LEW device (FIG. 2, 210) to a non-LEW connection such as a WLAN connection. This handover process allows for large amounts of data to be transferred at a faster rate through a non-LEW network than is possible through an LEW network. The mobile computing device (103) may send (block 808) data representing a print job from the mobile computing device (103) to the printing device (102) via the non-LEW connection.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processors (201, 301) of the printing devices (102) and the mobile computing device (103), respectively, or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The data storage devices (202, 302) may include a computer readable medium, a computer readable storage medium, or a non-transitory computer readable medium, among others. For example, the data storage devices (202, 302) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random, access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The above-described systems and methods may be utilized in any data processing scenario including, stand-alone hardware, mobile applications, through a computing network, or combinations thereof. Further, the systems and methods may be used in a computing network, a public cloud network, a private cloud network, a hybrid cloud network, other forms of networks, or combinations thereof. In one example, the methods provided by the above-described systems, printing devices, and computing devices are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the above-described systems, printing devices, and computing devices are executed by a local administrator.

The specification and figures describe a system and method of printing device discovery. A number of announcement messages are sent with a low energy wireless (LEW) device within the printing device. The printing device is in a sleep mode and the only device awake in the printing device is the LEW device. The printing device is woken up upon receiving a response to the announcement messages from a mobile computing device. The received response to the announcement messages creates an LEW connection with the mobile computing device. A second connection between the printing device and the mobile computing device is created. The second connection includes a relatively higher data transfer speed than the LEW connection. This printing device discovery may have a number of advantages, including: (1) utilizing a low energy wireless (LEW) device to initially set up a connection with a mobile computing device that takes milliwatts to run as opposed to hundreds or thousands of milliwatts if the printing device was not in sleep mode (zero line power is taken in by the printing device because the LEW device runs on a battery), making the printing device very inexpensive to run; (3) a reduction in overall energy consumption; (3) a prolonging of battery life for portable and embedded systems; (4) a reduction in cooling requirements; (5) a reduction in noise in running the printing device; and (6) a reduction in operating costs for energy and cooling, among other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of printing device discovery comprising:
with a low energy wireless (LEW) device within the printing device, sending a number of announcement messages, in which the printing device is in a sleep mode and the only device awake in the printing device is the LEW device;
waking up the printing device upon receiving a response to the announcement messages from a mobile computing device, the received response to the announcement messages creating an LEW connection with the mobile computing device; and creating a second wireless connection between the printing device and the mobile computing device of a connection type different than and having a relatively higher data transfer speed than the LEW connection.

2. The method of claim 1, in which the announcement messages comprise a service set identifier (SSID) of the printing device.

3. The method of claim 1, in which creating the second connection comprises, when the mobile computing device comes within a threshold proximity of the printing device connecting the mobile computing device to the printing device via a network to which the mobile computing device has previously connected.

4. The method of claim 1, in which the sleep mode comprises:
no electrical power being drawn by the printing device from an external power source; and
all devices within the printing device are in the sleep mode except the LEW device, the LEW device drawing power from an electrochemical cell associated with the LEW device.

5. The method of claim 1, in which the LEW device receives energy from a number of rechargeable electrochemical cells, the method further comprising:
with the LEW device, waking up the printing device if an available charge within the rechargeable electrochemical cells drops below a first threshold; and
with the printing device in a woken up state, charging the rechargeable electrochemical cells, until the available charge reaches a second threshold.

6. The method of claim 1, in which if a number of additional printing devices are located within the proximity of the mobile computing device and the printing device:
using a received signal strength indicator (RSSI) value provided by a RSSI device to determine the proximity of the mobile computing device to the printing device based on the RSSI value;
receiving a response from the mobile computing device regarding the mobile computing device's proximity to the printing device and additional printing devices;
connecting the printing device to the mobile computing device if the RSSI value indicates a closer proximity to the mobile computing device; and
not connecting the printing device to the mobile computing device and not waking up the printing device if the mobile computing device indicates it is in closer proximity to one of the additional printing devices.

7. The method of claim 6, in which the proximity of any printing device is a radial distance from an individual one of the printing devices.

8. A printing device, comprising: a low energy wireless (LEW) device, the LEW device sending a number of announcement messages while all components of the printing device are in a sleep mode; a processor; and memory, the memory storing executable code that when executed by the processor, causes the printing device to: establish an LEW connection with a mobile computing device upon receiving a response to the announcement messages; wake up the printing device upon receiving the response from the mobile computing device; and establish a second connection with the mobile computing device, the second connection comprising a non-LEW connection.

9. The printing device of claim 8, further comprising:
a power source;
a rechargeable power source to power the LEW device; and
a power control module;
in which the power control module wakes up the printing device and instructs the printing device to charge the rechargeable power source if an available charge within the rechargeable power source drops below a threshold while the printing device is in the sleep mode.

10. The printing device of claim 8, in which the printing device being in a sleep mode comprises:
no electrical power being drawn by the printing device; and
all devices within the printing device are in the sleep mode except the LEW device, the LEW device drawing power from an electrochemical cell associated with the LEW device.

11. The printing device of claim 8, further comprising a proximity detection device,
in which the proximity detection device determines the proximity of the mobile computing device with respect to the printing device based on a number of communication metrics,
in which the communication metrics are a received signal strength indicator (RSSI) value, a transmit power level, a received channel power indicator (RCPI) value, or combinations thereof.

12. The printing device of claim 11, in which if a number of additional printing devices are located within a radial distance of the mobile computing device and printing device:
using the proximity detection device, receiving the communication metrics provided by the proximity detection device to determine the proximity of the mobile computing device to the printing device and additional printing devices;
determining which of the printing device and additional printing devices to connect to based on the communication metrics; and
connecting the mobile computing device to the one of the printing device and additional printing devices whose communication metrics indicates the shortest distance.

13. A computer program product for communicatively coupling a printing device to a mobile computing device, the computer program product comprising: a computer readable storage device comprising computer usable program code executable by a processor to: continually transmit announcement messages from a low energy wireless (LEW) device within a printing device when all components of the printing device except the LEW device is in a sleep mode; establish an LEW connection with a mobile computing device when a response to the announcement messages is received from the mobile computing device at the printing device; wake up a number of components of the printing device in response to the establishment of the LEW connection; and establish a non-LEW, wireless connection between the mobile computing device and the printing device.

14. The computer program product of claim 13, in which the sleep mode comprises:
no electrical power being drawn by the printing device from an external power source; and
all devices within the printing device are in the sleep mode except the LEW device, the LEW device drawing power from an electrochemical cell associated with the LEW device.

15. The computer program product of claim 13, further comprising:
- computer usable program code to, when executed by a processor, receive energy for the LEW device from a number of rechargeable electrochemical cells;
- computer usable program code to, when executed by a processor, wake up the printing device if an available charge within the rechargeable electrochemical cells drops below a threshold; and
- computer usable program code to, when executed by a processor, charge the rechargeable electrochemical cells when the printing device is in a woken up state.

* * * * *